United States Patent
Smuk

(10) Patent No.: US 10,414,296 B2
(45) Date of Patent: Sep. 17, 2019

(54) RECLINER FOR A VEHICLE SEAT

(71) Applicant: Faurecia Automotive Seating, LLC, Auburn Hills, MI (US)

(72) Inventor: Wojciech Smuk, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 25 days.

(21) Appl. No.: 15/829,071

(22) Filed: Dec. 1, 2017

(65) Prior Publication Data
US 2018/0162239 A1  Jun. 14, 2018

Related U.S. Application Data

(60) Provisional application No. 62/432,913, filed on Dec. 12, 2016.

(51) Int. Cl.
*B60N 2/235* (2006.01)

(52) U.S. Cl.
CPC ............. *B60N 2/236* (2015.04); *B60N 2/235* (2013.01)

(58) Field of Classification Search
CPC ................................ B60N 2/236; B60N 2/235
USPC .......... 297/181, 284.1, 284.3, 311, 312, 313, 297/314, 316, 337, 344.15, 353, 354.1, 297/354.11, 452.11
See application file for complete search history.

(56) References Cited

U.S. PATENT DOCUMENTS

| | | | |
|---|---|---|---|
| 3,550,875 A | 12/1970 | Settimi | |
| 5,104,084 A | 4/1992 | Kumagai | |
| 5,299,853 A | 4/1994 | Griswold | |
| 5,871,259 A | 2/1999 | Gehart | |
| 6,788,048 B2 | 9/2004 | Hedayat | |
| 7,192,089 B2 | 3/2007 | Boudinot | |
| 7,222,919 B2 | 5/2007 | Uramichi | |
| 7,293,752 B2 | 11/2007 | McCulloch | |
| 7,330,008 B2 | 2/2008 | Lee | |
| 7,360,838 B2 | 4/2008 | Smuk | |
| 7,594,699 B2 | 9/2009 | Satta | |
| 8,285,454 B2 | 10/2012 | Norton | |
| 8,491,054 B2 | 7/2013 | Myers | |
| 8,651,578 B2 | 2/2014 | Yamada | |
| 8,845,027 B2 | 9/2014 | Nock | |
| 9,387,781 B2 | 7/2016 | Matt | |
| 2002/0171280 A1 | 11/2002 | Okazaki | |
| 2004/0217638 A1 | 11/2004 | Shao | |
| 2006/0202537 A1 | 9/2006 | Smuk | |

(Continued)

FOREIGN PATENT DOCUMENTS

| CN | 103182961 B | 7/2015 |
|---|---|---|
| DE | 10309083 A1 | 9/2004 |

OTHER PUBLICATIONS

Extended European Search Report for European App. No. 17193929.1 established Feb. 26, 2018, 4111 EP II, 8 pages.

(Continued)

*Primary Examiner* — Justin V Lewis
(74) *Attorney, Agent, or Firm* — Barnes & Thornburg LLP

(57) ABSTRACT

An occupant support includes a seat bottom and a seat back coupled to the seat bottom for movement about a seat-back pivot axis relative to the seat bottom between an upright position and a folded-forward position. The occupant support further includes a recliner configured to control movement of the seat back about the seat-back pivot axis relative to the seat bottom.

16 Claims, 8 Drawing Sheets

(56) References Cited

U.S. PATENT DOCUMENTS

| | | | |
|---|---|---|---|
| 2007/0289092 A1* | 12/2007 | Rohee | B60N 2/236 |
| | | | 16/221 |
| 2012/0074750 A1 | 3/2012 | Moriyama | |
| 2012/0205956 A1 | 8/2012 | Nock | |
| 2012/0261963 A1* | 10/2012 | Heyer | B60N 2/0232 |
| | | | 297/313 |
| 2013/0320735 A1 | 12/2013 | McCulloch | |
| 2014/0152067 A1 | 6/2014 | Pleskot | |
| 2014/0225411 A1 | 8/2014 | Matt | |
| 2015/0069809 A1 | 3/2015 | Matt | |
| 2016/0023577 A1 | 1/2016 | Yamada | |
| 2016/0023578 A1 | 1/2016 | Tame | |
| 2016/0101710 A1 | 4/2016 | Bonk | |
| 2016/0280098 A1 | 9/2016 | Frye | |

OTHER PUBLICATIONS

International (PCT) Search Report and Written Opinion completed Jul. 14, 2017 for PCT/US2017/026824, 3980 PCT II, 18 pages.
Office Action dated Feb. 6, 2019 for U.S. Appl. No. 15/718,089, 4111 US-U II (pp. 1-7).

* cited by examiner

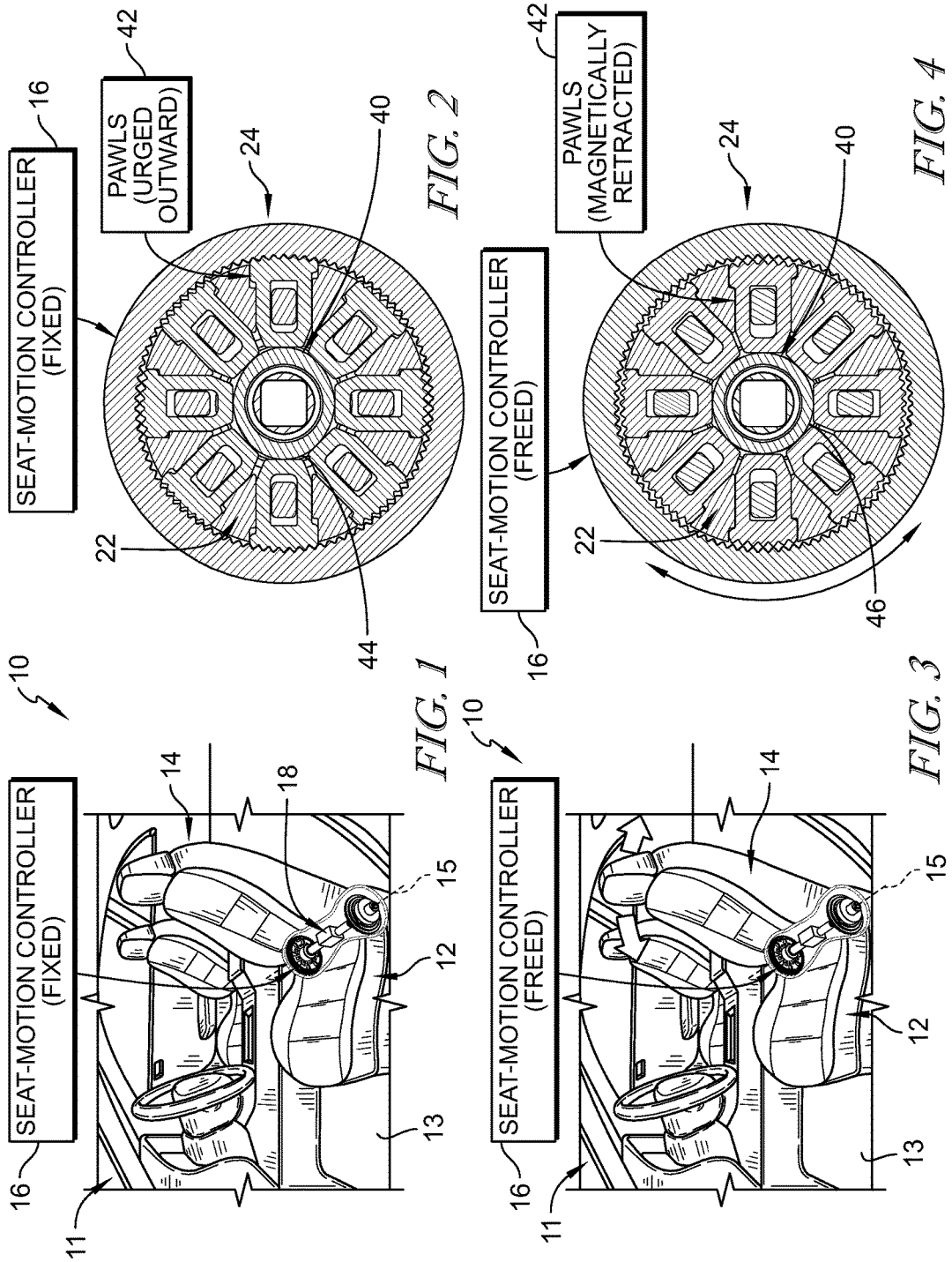

RECLINER FOR A VEHICLE SEAT

PRIORITY CLAIM

This application claims priority under 35 U.S.C. § 119(e) to U.S. Provisional Application Ser. No. 62/432,913, filed Dec. 12, 2016, which is expressly incorporated by reference herein.

BACKGROUND

The present disclosure relates to recliners, and particularly to recliners adapted for use with occupant supports. More particularly, the present disclosure relates to recliners configured to control movement of occupant supports included in vehicles.

SUMMARY

According to the present disclosure, a vehicle includes an occupant support mounted to a floor of the vehicle. The occupant support includes a seat bottom and a seat back coupled to the seat bottom for movement about a seat-back pivot axis relative to the seat bottom between an upright position and a folded-forward position. The occupant support further includes a seat-motion controller (sometimes called a recliner) configured to control movement of the seat back about the seat-back pivot axis relative to the seat bottom.

In illustrative embodiments, the seat-motion controller is magnetically actuated and includes a fixed flange, a mobile flange, and a recliner control unit. The fixed flange is coupled to seat bottom for movement with the seat bottom and the mobile flange is coupled to the seat back for movement with the seat back. The mobile flange is configured to rotate about the seat-back pivot axis relative to the fixed flange to pivot the seat back relative to the seat bottom. The recliner control unit controls rotation of the mobile flange relative to the fixed flange and, thus, the recliner control controls movement of the seat back relative to the seat bottom.

In illustrative embodiments, the recliner control unit includes a magnetic camshaft and a plurality of pawls arranged around the camshaft. The pawls are configured to move radially inward and outward to engage and disengage with the mobile flange to block and allow movement of the mobile flange relative to the fixed flange. The camshaft is configured to move axially between a plurality of positions to urge selectively the plurality of pawls toward engagement and away from engagement with the mobile flange. In a first position, a portion of the camshaft with a relatively large radius is aligned with the pawls to urge the pawls into engagement with the mobile flange. In a second position, a magnetized portion of the camshaft with a smaller radius is aligned with the pawls and magnetically urges the pawls away from engagement with the mobile flange.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of a passenger vehicle showing an occupant support with portions broken away to reveal a magnetically actuated seat-motion controller in accordance with the present disclosure, the occupant support includes a seat bottom mounted to a floor of the vehicle and a seat back mounted to the seat bottom to pivot relative to the seat bottom, and the seat-motion controller is in a fixed arrangement in which relative movement between the seat back and the seat bottom is blocked;

FIG. 2 is an section and diagrammatic view of the seat-motion controller of FIG. 1 showing that the seat-motion controller includes a mobile flange that is coupled to the seat back, a camshaft, and a plurality of pawls arranged between the camshaft and the mobile flange and suggesting that, when the seat-motion controller is in the fixed arrangement, the plurality of pawls are urged outward toward the mobile flange to block rotation of the mobile flange which blocks the seat back from moving relative to the seat bottom;

FIG. 3 is a view similar to FIG. 1 showing that the seat-motion controller has moved to a freed arrangement in which the seat back may move relative to the seat bottom about the seat-back pivot axis to adjust a position of the occupant support;

FIG. 4 is a view similar to FIG. 2 showing the seat-motion controller in the freed arrangement in which the camshaft has moved to cause the plurality of pawls to be magnetically retracted away from the mobile flange to allow the mobile flange to rotate which allows the seat back to move relative to the seat bottom;

DETAILED DESCRIPTION

Figure 5:
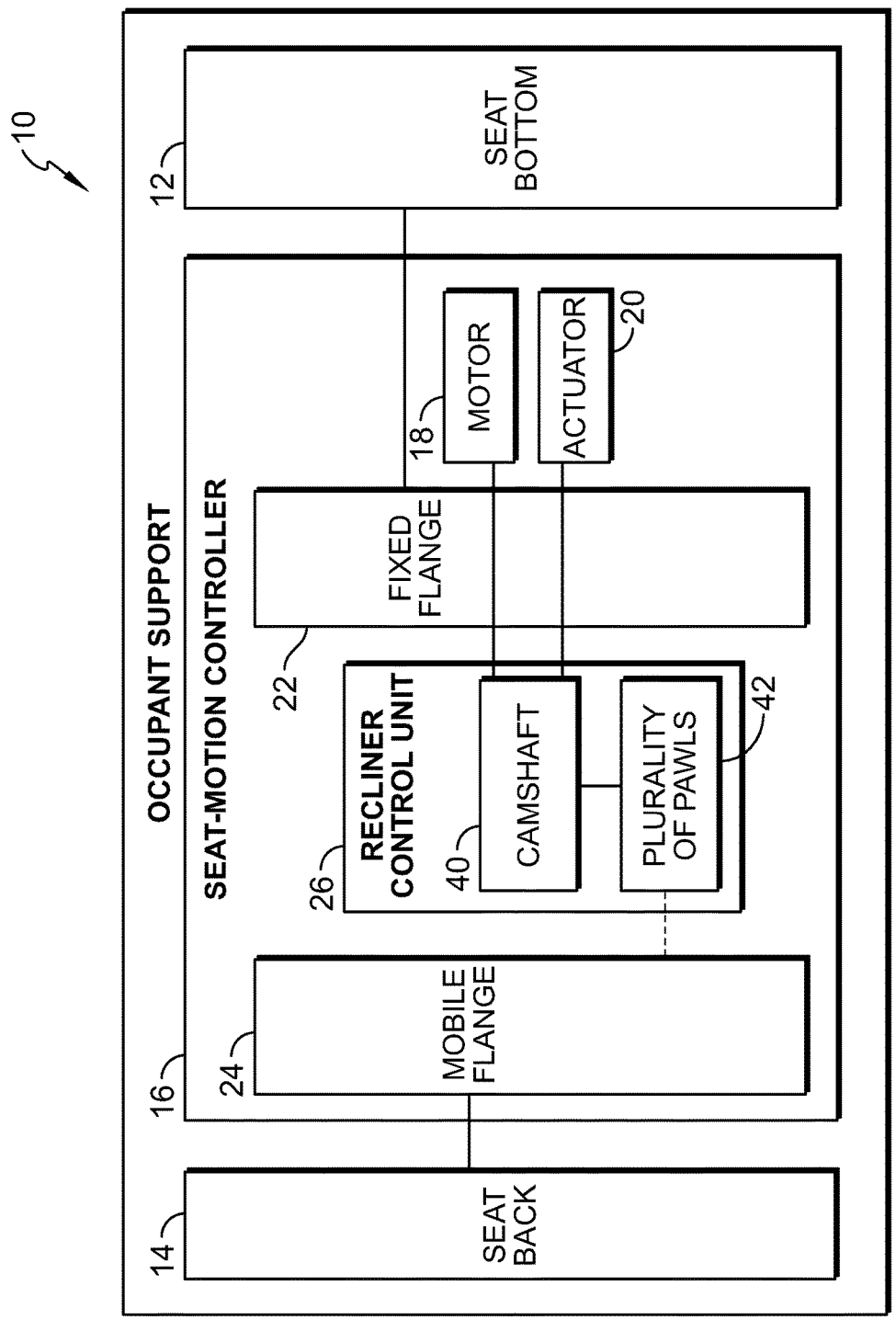
FIG. 5 is a diagrammatic view of the occupant support of FIG. 1 showing that the occupant support includes the seat bottom, the seat back, and the seat-motion controller coupled to the seat bottom and the seat back, and further showing that the seat-motion controller includes a fixed flange, the mobile flange configured to rotate relative to the fixed flange, a recliner control unit that includes the camshaft and the plurality of pawls, a motor coupled to a camshaft, and an actuator coupled to the camshaft.

A magnetically actuated seat-motion controller 16 in accordance with the present disclosure is adapted for use in an occupant support 10 of a vehicle 11 as shown in FIGS. 1-4. Occupant support 10 includes a seat bottom 12 and a seat back 14 configured to move relative to seat bottom 12 about a seat-back pivot axis 15 between an upright position and a folded-forward position. Seat-motion controller 16 (sometimes called a recliner) is configured to control movement of seat back 14 to block and allow selective movement of seat back 14 between the upright position and the folded-forward position. In the illustrative embodiment, occupant support 10 is a driver side occupant support 10.

Figure 6:
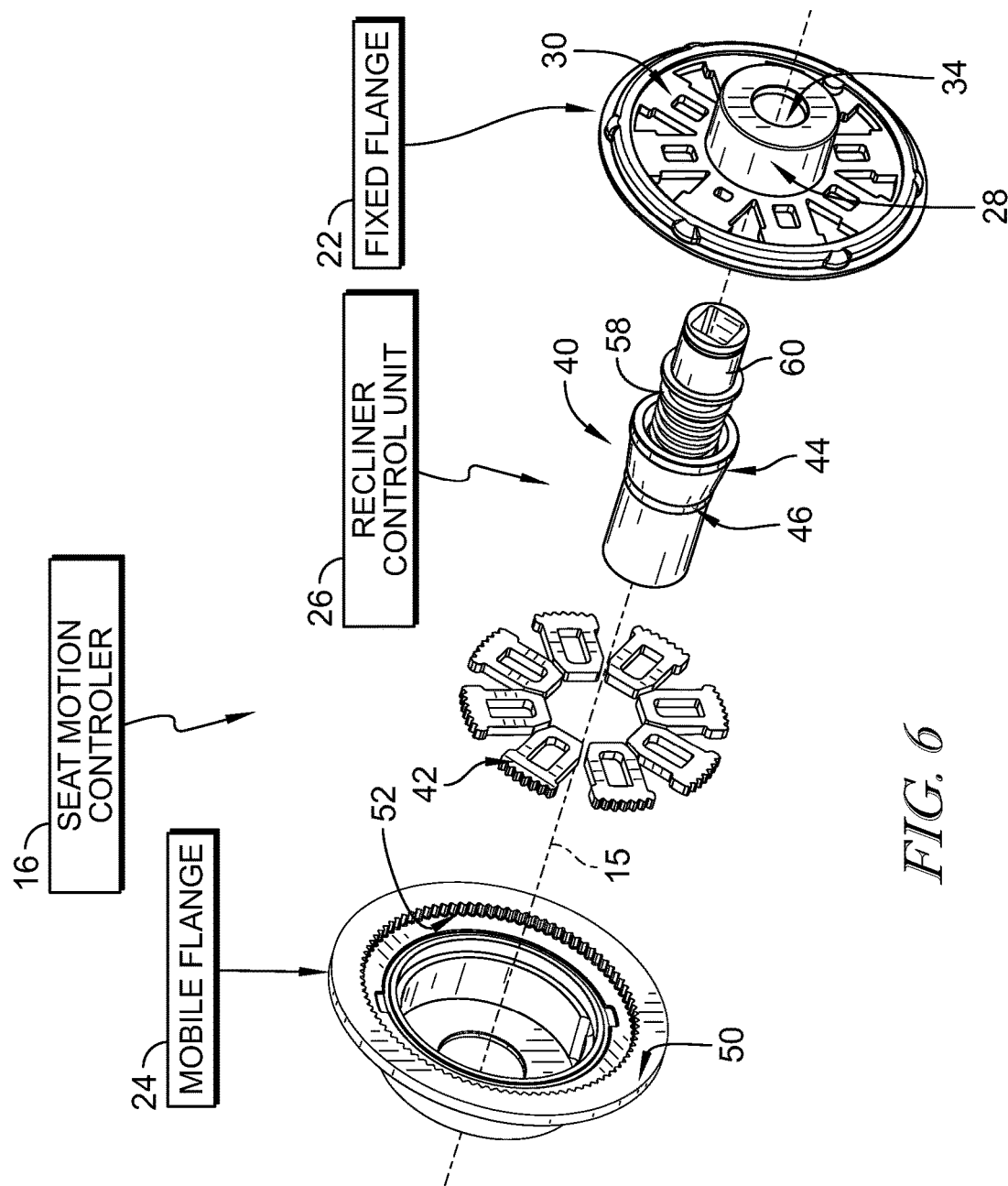
FIG. 6 is an exploded view of the seat-motion controller showing that the seat-motion controller unit includes, from left to right, the mobile flange adapted to couple to the seat back for movement therewith, the recliner control unit including the plurality of pawls and the camshaft, and the fixed flange adapted to couple to the seat bottom for movement therewith.

Seat-motion controller 16 includes a fixed flange 22, a mobile flange 24, and a recliner control unit 26 as shown in FIGS. 5 and 6. Fixed flange 22 is coupled to seat bottom 12 for movement with seat bottom 12. Mobile flange 24 is coupled to seat back 14 for movement with seat back 14 and is configured to rotate about seat-back pivot axis 15 relative to fixed flange 22 to cause seat back 14 to pivot relative to seat bottom 12. Recliner control unit 26 controls rotation of mobile flange 24 relative to fixed flange 22 and, thus, controls movement of seat back 14 about seat-back pivot axis 15 relative to seat bottom 12.

Figure 8:
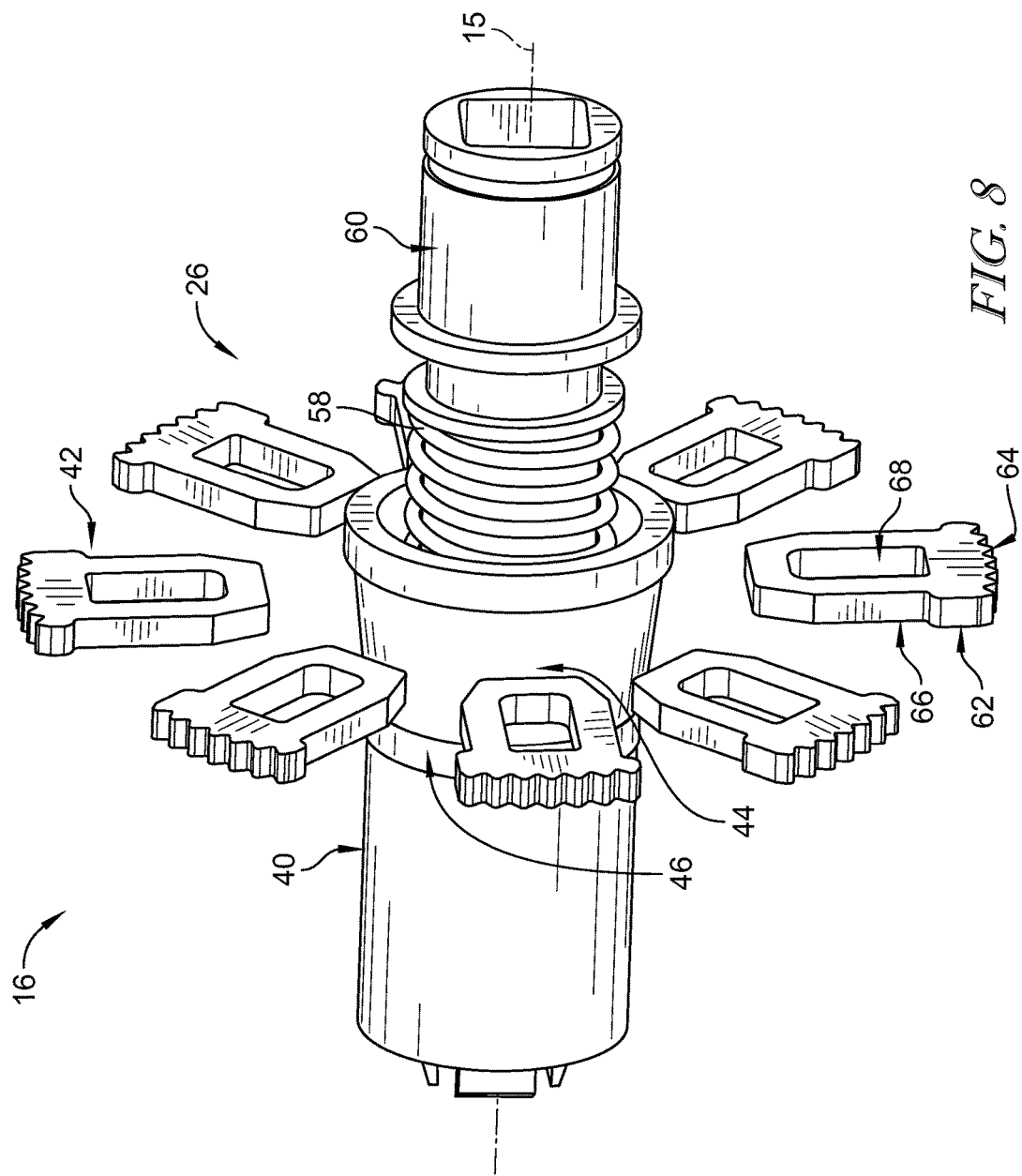
FIG. 8 is a perspective view of the recliner control unit showing that the recliner control unit includes the camshaft and the plurality of pawls, the camshaft extends axially relative to the seat-back pivot axis and the plurality of pawls are arranged circumferentially around the camshaft, each pawl includes a plurality of radially outwardly extending pawl teeth configured to mate with the flange teeth included in the mobile flange.

Recliner control unit 26 includes a camshaft 40 and a plurality of steel pawls 42 arranged around camshaft 40 as shown in FIGS. 6 and 8. The plurality of pawls 42 are configured to engage and disengage with mobile flange 24 to block and allow, respectively, movement of mobile flange 24 relative to fixed flange 22. Camshaft 40 is configured to move between positions to urge the plurality of pawls 42 toward engagement and to magnetically urge the pawls 42 away from engagement with mobile flange 24 to control movement of seat back 14 relative to seat bottom 12.

Camshaft 40 includes a cam 44 and a magnetic hub 46 spaced apart axially from cam 44 as suggested in FIGS. 6 and 8. Cam 44 has a greater maximum radius than hub 46. Camshaft 40 is moveable axially between an extended position and a retracted position to cause one of cam 44 and hub 46 to align with the plurality of pawls 42. When camshaft 40 is in the extended position, cam 44 is aligned with the plurality of pawls 42 and urges the plurality of pawls 42 radially outward toward mobile flange 24 to cause at least one pawl 42 to engage mobile flange 24 and block rotation of mobile flange 24 as suggested in FIGS. 9 and 10. When camshaft 40 is in the retracted position, hub 46 is aligned with the plurality of pawls 42 and magnetically urges the plurality of pawls 42 radially inward away from mobile flange 24 to space apart pawls 42 from mobile flange 24 and allow rotation of mobile flange 24 as suggested in FIGS. 11 and 12.

In some embodiments, hub 46 is monolith and comprises magnetic material as shown in FIG. 8. In some embodiments, hub 46 includes a body 54 and a magnetic band 56 arranged around body 54 to urge the plurality of pawls 42 away from mobile flange 24 when hub 46 is aligned axially with the plurality of pawls 42 as suggested in FIG. 13.

In some embodiments, seat-motion controller 16 is configured to selectively block movement and move mobile flange 24 when the plurality of pawls are urged toward mobile flange 24. Recliner control unit 26 blocks movement of mobile flange 24 when camshaft 40 is in the extended position urging the plurality of pawls 42 outward and not rotating. Recliner control unit 26 rotates mobile flange 24 when camshaft 40 is in the extended position urging the plurality of pawls 42 outward and also rotating. As a result, mobile flange 24 can be either blocked from moving or moved when the plurality of pawls 42 are urged toward mobile flange 24 by controlling rotation of camshaft 40.

Figure 9:
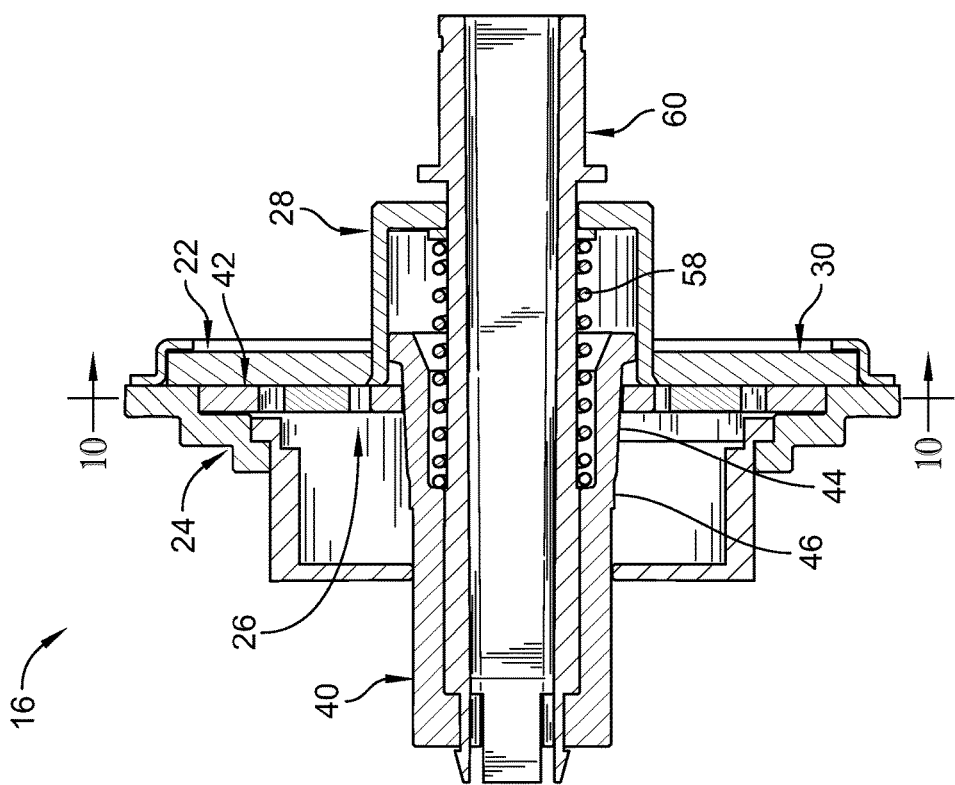
FIG. 9 is a section view of the seat-motion controller showing the camshaft in a first position in which the camshaft urges the plurality of pawls radially outward to cause at least one pawl to engage with the mobile flange.

In the illustrative embodiment, cam 44 is eccentric shaped as shown in FIG. 9. To move mobile flange 24 when pawls 42 are urged outward, camshaft 40 is rotated and cam 44 moves each of the plurality of pawls 42 into and out of engagement with mobile flange 24 in a predetermined sequence. The in-and-out movement of the plurality of pawls 42 causes mobile flange 24 and, thus, seat back 14 to rotate about seat-back pivot axis 15. To block mobile flange 24 and, thus, seat back 14 in a select position when pawls 42 are urged outward, camshaft 40 is blocked from rotating and cam 44 urges at least one of the plurality of pawls 42 into engagement with mobile flange 24.

Referring now to FIG. 1, occupant support 10 includes seat bottom 12, seat back 14, and seat-motion controller 16. Seat bottom 12 is mounted to a floor 13 of vehicle 11 for movement with vehicle 11. Seat back 14 is configured to pivot relative to seat bottom 12 about seat-back pivot axis 15 between the upright position and folded-forward position. Seat-motion controller 16 is configured to control movement of seat back 14 relative to seat bottom 12 to allow seat back 14 to be adjusted for a comfort of an occupant of occupant support 10 or for accessing an area of vehicle 11 behind occupant support 10.

Seat-motion controller 16 includes fixed flange 22, mobile flange 24, and recliner control unit 26 as suggested in FIGS. 5 and 6. Fixed flange 22 is coupled to seat bottom 12 such that fixed flange 22 is blocked from rotating about seat-back pivot axis 15 relative to seat bottom 12. Mobile flange 24 is coupled to seat back 14 for movement with seat back 14. Recliner control unit 26 controls rotation of mobile flange 24 relative to fixed flange 22. As a result, recliner control unit 26 controls the position of seat back 14 about seat-back pivot axis 15 relative to seat bottom 12.

Illustratively, seat-motion controller 16 further includes a motor 18 and an actuator 20 coupled to recliner control unit 26 as shown in FIG. 5. Motor 18 is configured to drive recliner control unit 26 in response to an input. Actuator 20 is configured to move camshaft 40 between positions in response to input to fix or free seat back 14 for pivoting movement about seat-back pivot axis 15. In other embodiments, recliner control unit 26 is manually driven by the operator of occupant support 10, for example, by hand or by a knob.

Figure 7:
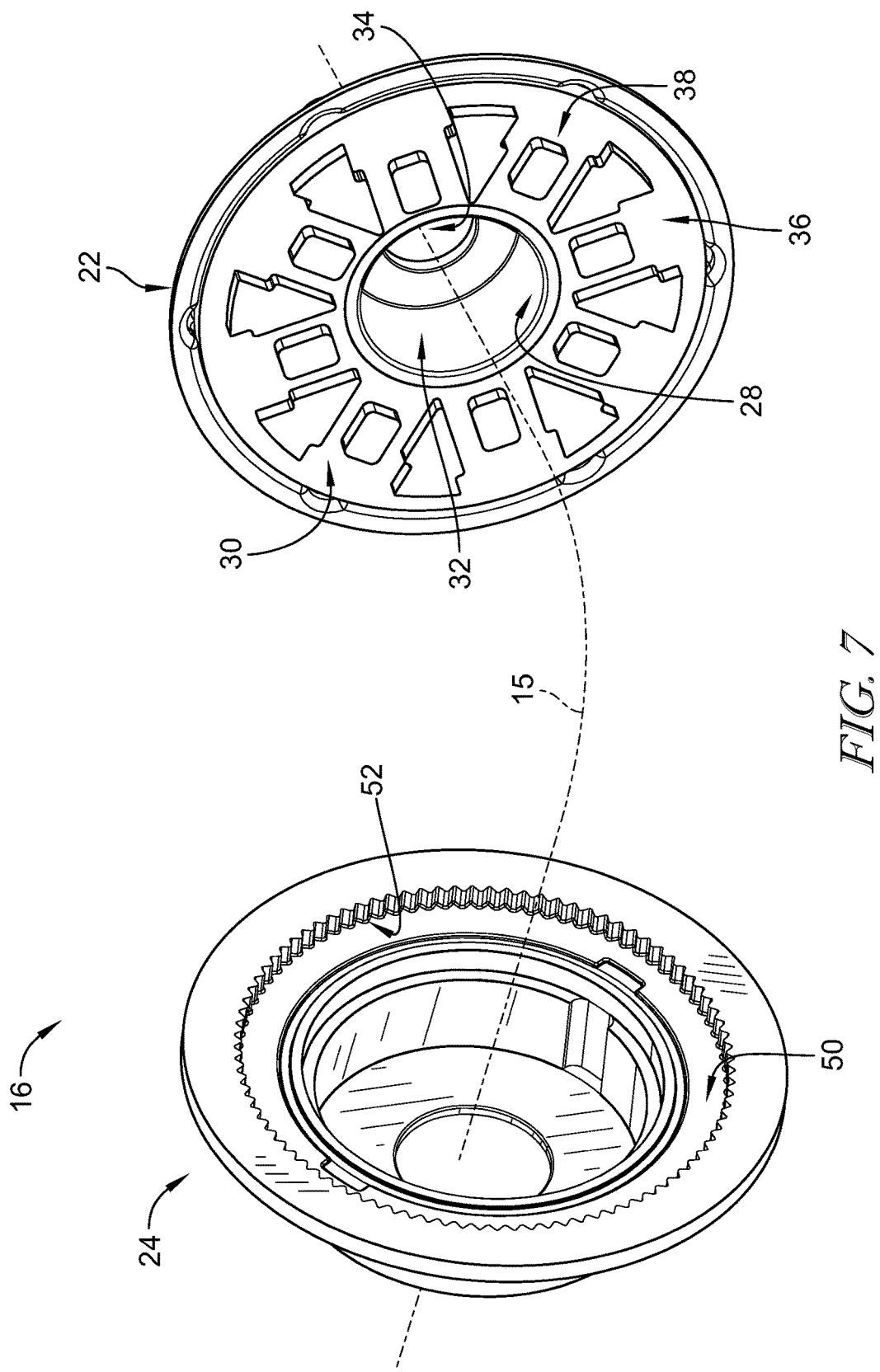
FIG. 7 is a perspective view of the mobile flange and the fixed flange included in the seat-motion controller showing that the mobile flange includes a plurality of radially extending flange teeth configured to mate with pawl teeth included in the plurality of pawls and that the fixed flange includes guide wedges arranged to limit the plurality of pawls to radially inward and outward movement.

Fixed flange 22 and mobile flange 24 included in seat-motion controller 16 are shown in greater detail without recliner control unit 26 in FIG. 7. Fixed flange 22 includes a bushing 28 and a static disc 30. Bushing 28 is arranged circumferentially about seat-back pivot axis 15 and a portion of recliner control unit 26. Static disc 30 extends radially outward away from bushing 28 and is coupled to seat bottom 12. Illustratively, static disc 30 is welded to seat bottom 12. In other embodiments, static disc 30 is coupled to seat bottom 12 by fasteners or any other suitable alternative. In other embodiments, fixed flange 22 is coupled to seat back 14 and mobile flange 24 is coupled to seat bottom 12.

Bushing 28 is formed to define a shaft-assembly receiving cavity 32 and a bushing aperture 34 as shown in FIG. 7. Shaft-assembly receiving cavity 32 is sized to receive a portion of a camshaft 40 included in recliner control unit 26. Bushing aperture 34 is arranged to open into shaft-assembly receiving cavity 32 and allows access to camshaft 40 so that, for example, camshaft 40 can be driven by motor 18.

Static disc 30 includes a static-disc body 36 and pawl guides 38 as shown in FIG. 7. Static-disc body 36 extends radially outward away from bushing 28. Pawl guides 38 extend axially away from static-disc body 36 and are arranged circumferentially about seat-back pivot axis 15. Pawl guides 38 cooperate with pawls 42 to limit movement of pawls 42. In the illustrative embodiment, pawl guides 38 limit pawls 42 to radially inward and outward movement relative to seat-back pivot axis 15.

Mobile flange 24 includes a body 50 and a plurality of radially inwardly extending flange teeth 52 arranged circumferentially about seat-back pivot axis 15 as shown in FIG. 7. Body 50 is formed to include an aperture configured to receive a portion of camshaft 40. Flange teeth 52 cooperate with the plurality of pawls 42 to block and allow rotation of mobile flange 24 about seat-back pivot axis 15.

Recliner control unit 26 includes camshaft 40 and the plurality of pawls 42 as shown in FIG. 8. Camshaft 40 is configured to urge selectively that plurality of pawls 42 radially inward and outward. The plurality of pawls 42 are arranged circumferentially about camshaft 40 and selectively block rotation of mobile flange 24, rotate mobile flange 24 incrementally about seat-back pivot axis 15, and allow free rotation of mobile flange 24.

Figure 10:
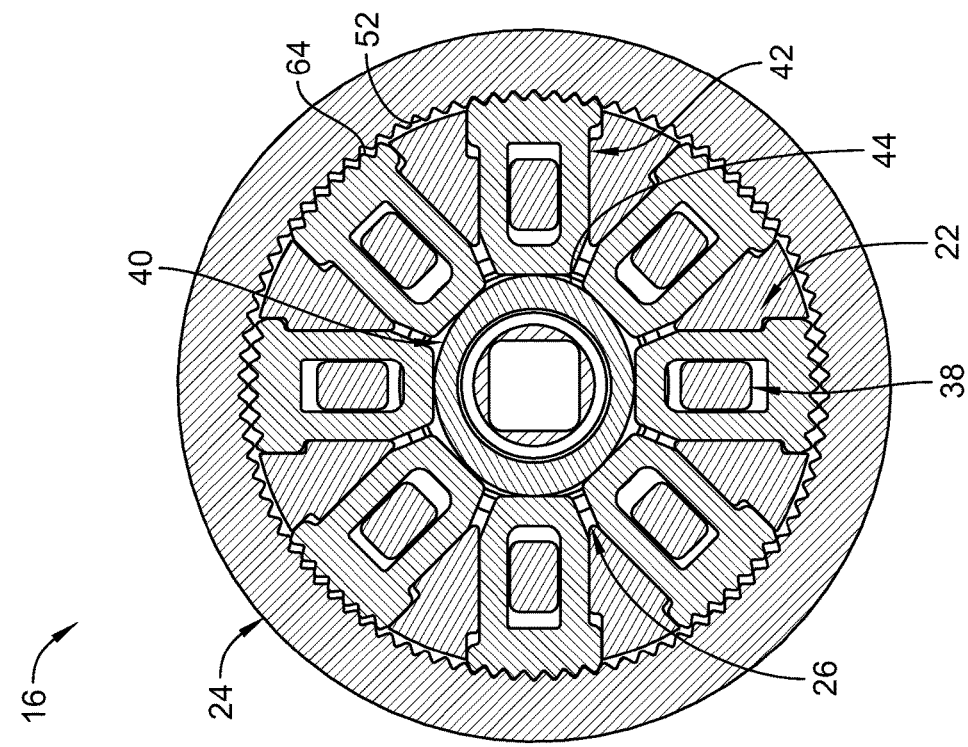
FIG. 10 is a section view of the seat-motion controller showing the camshaft in the first position in which the camshaft urges the plurality of pawls radially outward and showing that at least one pawl is engaged with the mobile flange to block rotation of the mobile flange relative to the fixed flange so that the seat back is maintained in a set position.
Figure 12:
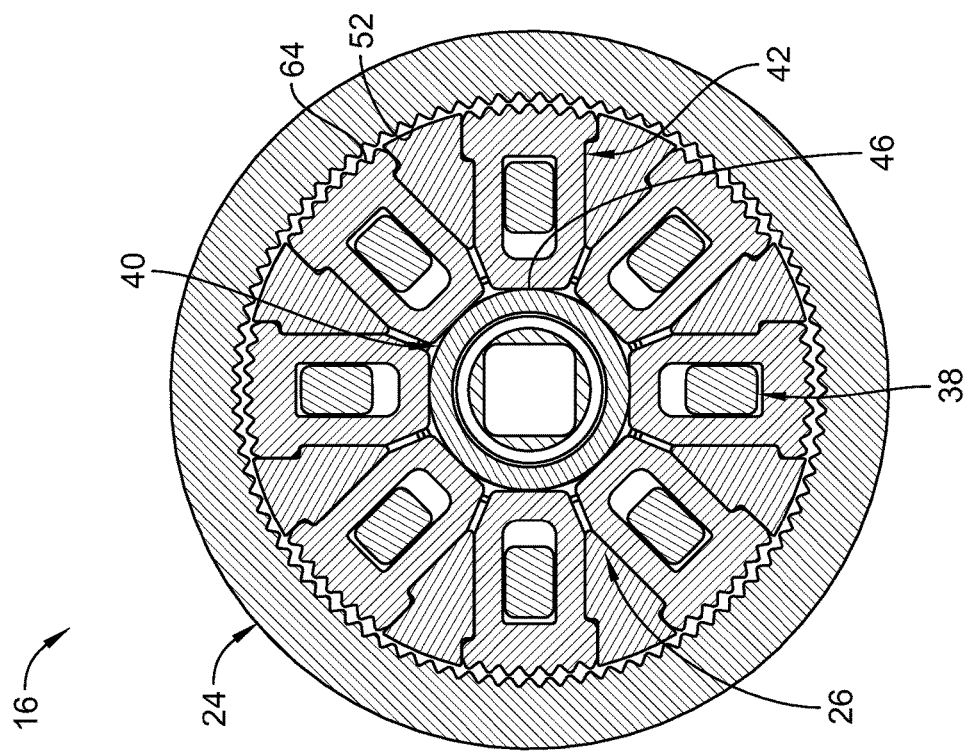
FIG. 12 is a section view of the seat-motion controller showing the camshaft in the second position in which the plurality of pawls radially are magnetically urged inwardly away from the mobile flange to space apart the pawls from the mobile flange to free the mobile flange for movement relative to the fixed flange so that the seat back may be adjusted relative to the seat bottom.
Figure 11:
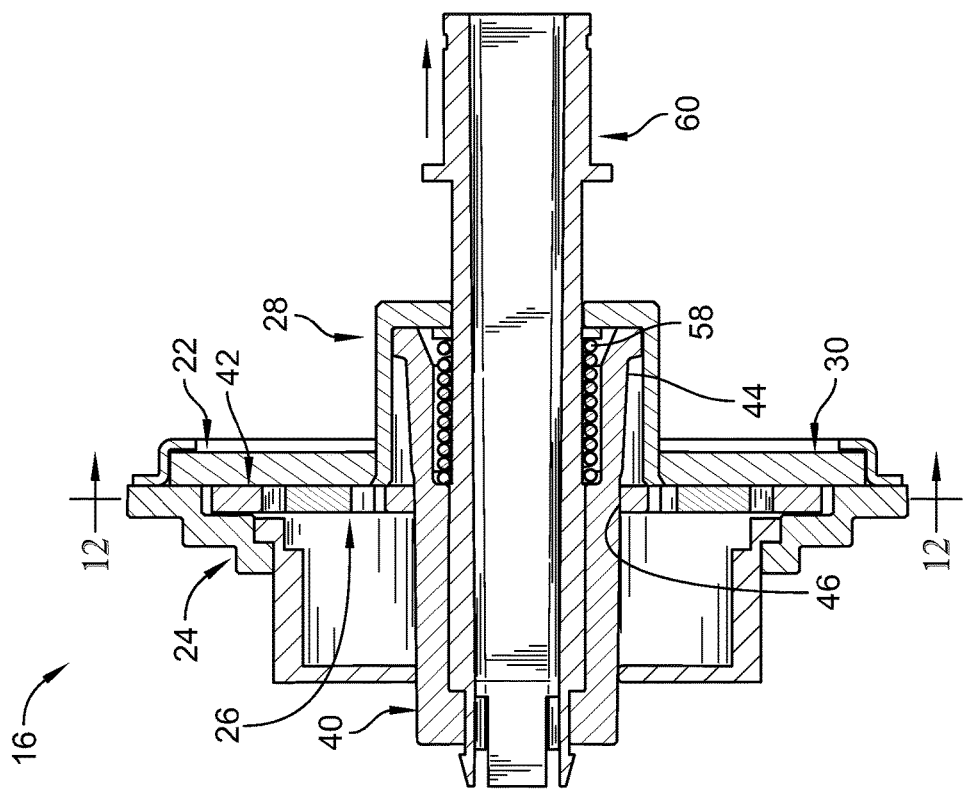
FIG. 11 is a section view of the seat-motion controller showing the camshaft in a second position in which the plurality of pawls radially are magnetically urged inwardly away from the mobile flange to cause the pawls to be spaced apart from the mobile flange.

Camshaft 40 comprises a shaft that extends along seat-back pivot axis 15 and is configured to move axially between an extended position and a retracted position as suggested in FIGS. 9 and 11. Camshaft 40 is configured to rotate in a clockwise direction and a counter-clockwise direction. Camshaft 40 includes a cam 44 and a hub 46 as shown in FIGS. 8-12. Cam 44 is aligned with the plurality of pawls 42 and configured to urge the plurality of pawls radially outward when camshaft 40 is in the extended position as shown in FIGS. 9 and 10. Hub 46 is aligned with the plurality of pawls 42 and configured to urge the plurality of pawls 42 radially inward away from mobile flange 24 when camshaft 40 is in the retracted position as shown in FIGS. 11 and 12.

Cam 44 has an eccentric, non-circular shape such that cam 44 pushes at least one of the pluralities of pawls 42 radially outward when camshaft 40 is in the extended position as shown in FIGS. 11 and 12. In some embodiments, cam 44 has one of an eccentric shape, oval shape, lobular shape, and circular shape. Illustratively, cam 44 pushes at least one and less than all of the plurality of pawls 42 radially outward when camshaft 40 is in the extended position.

When camshaft 40 is in the extended position and not rotating, the at least one and less than all of the plurality of pawls 42 engage mobile flange 24 to block rotation of mobile flange 24 as shown in FIG. 10. When camshaft 40 is in the extended position and rotated about the seat-back pivot axis 15, the eccentric, non-circular shape of cam 44 pushes alternating subsets of pawls 42 radially outward while other subsets of pawls 42 are free to move radially inward. As a result, pawls 42 apply a net rotation force to mobile flange 24 that causes mobile flange 24 to rotate about seat-back pivot axis 15 incrementally.

In other embodiments, cam 44 has a circular shape and urges all of the plurality of pawls 42 radially outward toward mobile flange 24 when camshaft 40 is in the extended position. As a result, mobile flange 24 is blocked from rotating even if camshaft 40 is rotated in the extended position.

Illustratively, cam 44 is tapered and slopes radially outward as it extends axially away from hub 46 as shown in FIG. 8. The taper of cam 44 may reduce the effects of manufacturing tolerances and wear of the components over time. A bias member 58 biases camshaft 40 toward the extended position. The taper of cam 44 pushes pawls 42 increasingly radial outward as camshaft 40 moves axially toward the extended position because of the increasing diameter of the tapered surface. Eventually, axial movement of camshaft 40 may be blocked in response to pawls 42 applying a sufficient axial counterforce to camshaft 40 to counter a bias force of bias member 58.

Hub 46 is located axially adjacent to cam 44 as shown in FIG. 8. Hub 46 extends axially along seat-back pivot axis 15 and has a maximum radius that is smaller than a maximum radius of cam 44. Hub 46 is aligned axially with the plurality of pawls 42 when camshaft 40 is in the retracted position to provide space for the plurality of pawls 42 to move radially inward away from mobile flange 24 toward seat-back pivot axis 15 as shown in FIGS. 11 and 12. Hub 46 is magnetic and urges steel pawls 42 to retract radially inward toward seat-back pivot axis 15 and away from mobile flange 24 when camshaft 40 is in the retracted position.

Figure 13:
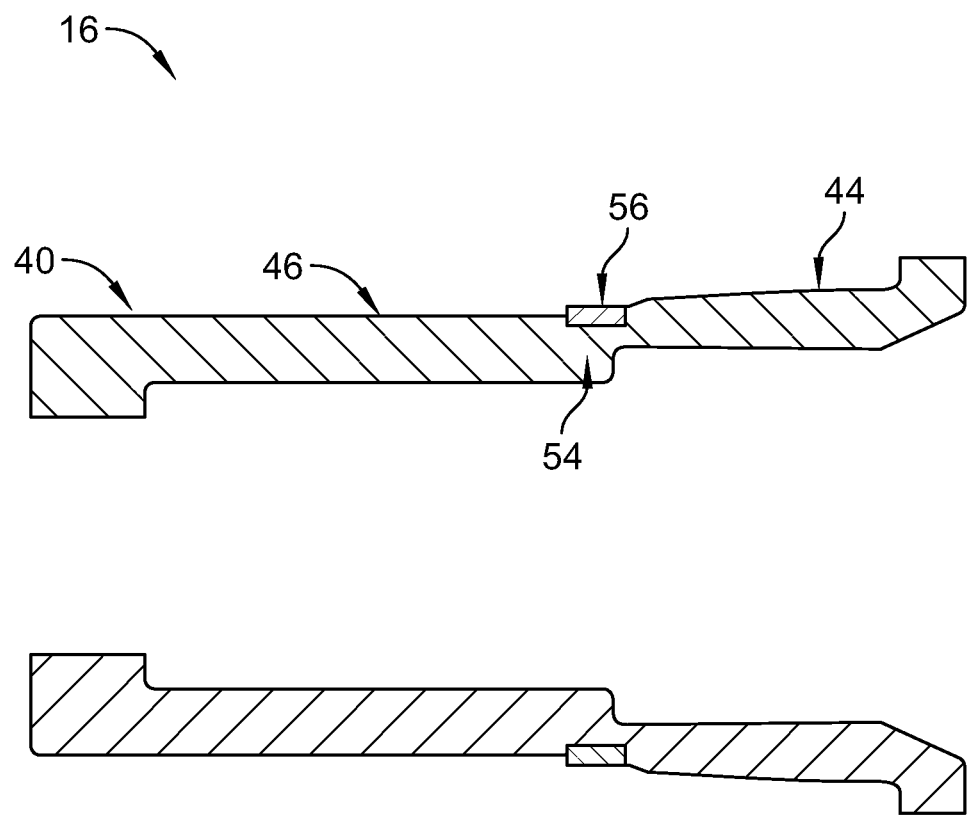
FIG. 13 is another embodiment of a camshaft having a cam and a hub, the hub having a body and a magnetic band arranged around the body.

In some embodiments, cam 44 and hub 46 are integrally formed. In some embodiments, camshaft 40 is a magnetic monolithic component. In some embodiments, cam 44 is magnetic. In some embodiments, hub 46 includes a hub body 54 and a magnetic band 56 arranged around hub body 54 as shown in FIG. 13. In some embodiments, an electric current is conducted to camshaft 40 to magnetically charge camshaft 40.

Recliner control unit 26 further includes bias member 58 and a drive shaft 60 in the illustrative embodiment as shown in FIG. 8. Bias member 58 is positioned between camshaft 40 and fixed flange 22 and biases camshaft 40 toward the extended position and away from the retracted position. Drive shaft 60 is coupled to camshaft 40 for axial and rotational movement therewith and is configured to transmit rotational movement from motor 18 to camshaft 40. Actuator 20 is configured to move camshaft 40 between the extended position and the retracted position in response to an input.

Each of the plurality of pawls 42 comprises material that responds to magnetic fields. Pawls 42 comprise material that are attracted to and/or repelled by a magnet field. In some embodiments, pawls 42 comprise ferromagnetic materials. In the illustrative embodiment, pawls 42 comprise steel.

Each pawl 42 includes a head 62 having a plurality of pawl teeth 64 and a pawl body 66 formed to include a pawl-guide slot 68 as shown in FIGS. 8, 10, and 12. Pawl teeth 64 included in heads 62 are adapted to engage and disengage flange teeth 52 included in mobile flange 24 to control movement of mobile flange 24. Heads 62 are spaced apart from mobile flange 24 when camshaft 40 is in the retracted position to allow mobile flange 24 to freely rotate relative to fixed flange 22 as shown in FIG. 4. Heads 62 engage mobile flange 24 when camshaft 40 is in the extended position as shown in FIG. 2. Pawl-guide slots 68 receive pawl guides 38 included in fixed flange 22.

FIGS. 9 and 10 show operation of seat-motion controller 16 in a fixed arrangement. Camshaft 40 is in the extended position such that cam 44 is aligned axially with pawls 42. When power is not provided to drive shaft 60, camshaft 40 does not rotate. Cam 44 urges at least one pawl 42 radially outward so that pawl teeth 64 of the at least one pawl 42 mate with flange teeth 52 included mobile flange 24. As a result, mobile flange 24 is blocked from rotating about seat-back pivot axis 15 and, thus, seat back 14 is fixed in a selected position and is blocked from pivoting about seat-back pivot axis 15 relative to seat bottom 12.

If the operator desires to adjust incrementally the orientation of seat back 14 relative to seat bottom 12 in the fixed arrangement, a user input may be applied to occupant support 10 to cause drive shaft 60 to rotate which rotates camshaft 40. As camshaft 40 rotates, cam 44 pushes pawls 42 radially outward sequentially to cause pawls 42 to apply the net rotation force to mobile flange 24 which causes mobile flange 24 to rotate incrementally. Camshaft 40 may be rotated in either direction to cause mobile flange 24 to rotate selectively clockwise and counter-clockwise.

FIGS. 11 and 12 show seat-motion controller 16 in a freed arrangement in which seat back 14 is free to pivot about seat-back pivot axis 15 relative to seat bottom 12 in response to a folding force being applied to seat back 14. To move seat-motion controller 16 from the fixed arrangement to the freed arrangement, camshaft 40 is moved by actuator 20 axially from the extended position shown in FIG. 9 to the retracted position shown in FIG. 11.

When camshaft 40 is in the retracted position, hub 46 is axially aligned with the plurality of pawls 42 as shown in FIGS. 11 and 12. Hub 46 magnetically urges steel pawls 42 radially inward toward seat-back pivot axis 15 away from mobile flange 24. As a result, mobile flange 24 is free to rotate about seat-back pivot axis 15 relative to fixed flange 22.

Some recliners may either include an additional part, such as a mask, or special features in the pawls to provide the function of disengaging pawls and keeping them away from mobile flange teeth to block ratcheting. Some discontinuous recliners may be equipped with features or additional devices, i.e. masks, to retract and keep pawls away from mobile flange teeth. These are typically mechanical interfaces, meaning that there is a contact between parts to disengage the pawls and keep them away from the mobile flange teeth to block ratcheting during rotation of the mobile flange during adjustment of the seat back.

These features may be difficult to manufacture due to limited space available inside a recliner. The present disclosure may minimize or eliminate additional parts or custom features used to retract pawls, and may resolve difficulties in designing pawl-retracting devices or features in certain configurations of recliners.

By using steel pawls 42 with a magnetized camshaft 40, it is possible to replace the function of the mechanical mask with magnetic force. During recliner unlocking, pawls 42 are moved away from mobile flange teeth 52 due to its rotation and geometry of the teeth. The magnetized camshaft 40 stays in contact with the pawls 42, so a magnetic force may be sufficient to enhance this contact.

In one aspect, a magnetic band 56 may be added to the camshaft 40. In this case, the recliner provides pawls that are retracting with an additional magnetic band 56 installed on the camshaft 40. In the locked position, the pawls 42 are under pressure from the tapered shape of the camshaft 40 being pushed by the spring 58, but there may be little or no force on pawls 42 generated by magnetic band 56.

To unlock the recliner including the magnetic band 56, the camshaft 40 is moved axially against the force of the spring 58. At the completion of the camshaft 40 range of motion, the magnetic force is pulls the pawls 42 to contact the magnetic band 56, keeping the pawls away from mobile flange 24. Pawls 42 are retracted when a recliner is unlocked to avoid ratcheting noise caused by pawl teeth contacting mobile flange teeth during its rotation.

Some other recliners may be provided with a mask that is connected rigidly to the cam through interlocking features. By using steel pawls 42 with a magnetized camshaft 40, it is possible to replace the function of the mechanical mask with magnetic force. During recliner unlocking, pawls 42 are moved away from mobile flange teeth due to its rotation and geometry of the teeth. camshaft 40 may stay in close proximity with pawls 42 so that a magnetic force could be sufficient to enhance this contact.

The invention claimed is:

1. A seat-motion controller for an occupant support, the seat-motion controller comprising
   a fixed flange adapted to couple to a seat bottom for movement with the seat bottom,
   a mobile flange adapted to couple to a seat back for movement with the seat back and the mobile flange configured to rotate about an axis relative to the fixed flange, and
   a recliner control unit configured to control movement of the mobile flange about the axis relative to the fixed flange, the recliner control unit including an axially extending camshaft and a plurality of pawls arranged circumferentially about the camshaft,
   wherein the camshaft is movable between a first position in which the camshaft urges the plurality of pawls into engagement with the mobile flange to block rotation of the mobile flange relative to the fixed flange about the axis and a second position in which the camshaft magnetically urges the plurality of pawls away from engagement with the mobile flange to allow rotation of the mobile flange relative to the fixed flange about the axis,
   wherein the camshaft includes a cam and a magnetic hub spaced apart axially relative to the cam, the cam is aligned axially with the plurality of pawls when the camshaft is in the first position, and the magnetic hub is aligned axially with the plurality of pawls when the camshaft is in the second position.

2. The seat-motion controller of claim 1, wherein the cam has a first maximum radius and the magnetic hub has a second maximum radius that is smaller than the first maximum radius.

3. The seat-motion controller of claim 2, wherein the cam is tapered.

4. The seat-motion controller of claim 1, wherein the cam has a non-circular cross-section when viewed along the axis.

5. The seat-motion controller of claim 4, wherein the cam is magnetic.

6. The seat-motion controller of claim 4, wherein less than all of the plurality of pawls are engaged with the mobile flange when the camshaft is in the first position.

7. The seat-motion controller of claim 5, wherein the camshaft is configured to rotate about the axis when the camshaft is in the first position to cause the cam to push sequentially the plurality of pawls into engagement with the mobile flange to cause the mobile flange to rotate about the axis relative to the fixed flange.

8. A seat-motion controller comprising
a fixed flange,
a mobile flange configured to rotate about an axis relative to the fixed flange, and
a recliner control unit including a shaft that extends axially along the axis and a plurality of pawls arranged circumferentially around the shaft, the shaft being movable between a first position in which the shaft urges the plurality of pawls toward the mobile flange and a second position in which the shaft magnetically urges the plurality of pawls away from engagement with the mobile flange,
wherein less than all pawls are engaged with the mobile flange when the shaft is in the first position.

9. The seat-motion controller of claim 8, wherein the shaft includes a cam and a hub spaced apart axially relative to the cam, the cam has a first maximum radius, the hub has a second maximum radius smaller than the first maximum radius, the cam is aligned axially with the plurality of pawls when the shaft is in the first position, and the hub is aligned axially with the plurality of pawls when the shaft is in the second position.

10. The seat-motion controller of claim 9, wherein at least one of the cam and the hub is magnetic.

11. The seat-motion controller of claim 9, wherein the cam is tapered.

12. The seat-motion controller of claim 9, wherein the cam has a non-circular cross-section when viewed along the axis.

13. The seat-motion controller of claim 8, wherein the shaft is configured to rotate about the axis when the shaft is in the first position to push sequentially the plurality of pawls into engagement with the mobile flange to cause the mobile flange to rotate about the axis relative to the fixed flange.

14. The seat-motion controller of claim 8, wherein the shaft includes a cam and a hub spaced apart axially relative to the cam, the hub includes a body and a magnetic band arranged circumferentially about the body, the cam is aligned axially with the plurality of pawls when the shaft is in the first position, and the magnetic band is aligned axially with the plurality of pawls when the shaft is in the second position.

15. A method comprising
providing a fixed flange, a mobile flange, and a recliner control unit having a plurality of pawls configured to control rotation of the mobile flange about an axis relative to the fixed flange,
urging the plurality of pawls toward the mobile flange to block rotation of the mobile flange relative to the fixed flange about the axis, and
urging magnetically the plurality of pawls away from the mobile flange to allow rotation of the mobile flange relative to the fixed flange about the axis,
wherein the recliner control unit further includes a shaft having a magnetic portion and the method further includes moving the shaft to align axially the magnetic portion of the shaft with the plurality of pawls.

16. The method of claim 15, further comprising rotating the shaft while the pawls are urged toward the mobile flange to cause the mobile flange to rotate about the axis relative to the fixed flange.

* * * * *